Jan. 27, 1931. C. C. FARMER 1,790,208
MAGNETIC BRAKE
Filed Feb. 17, 1928 2 Sheets-Sheet 1
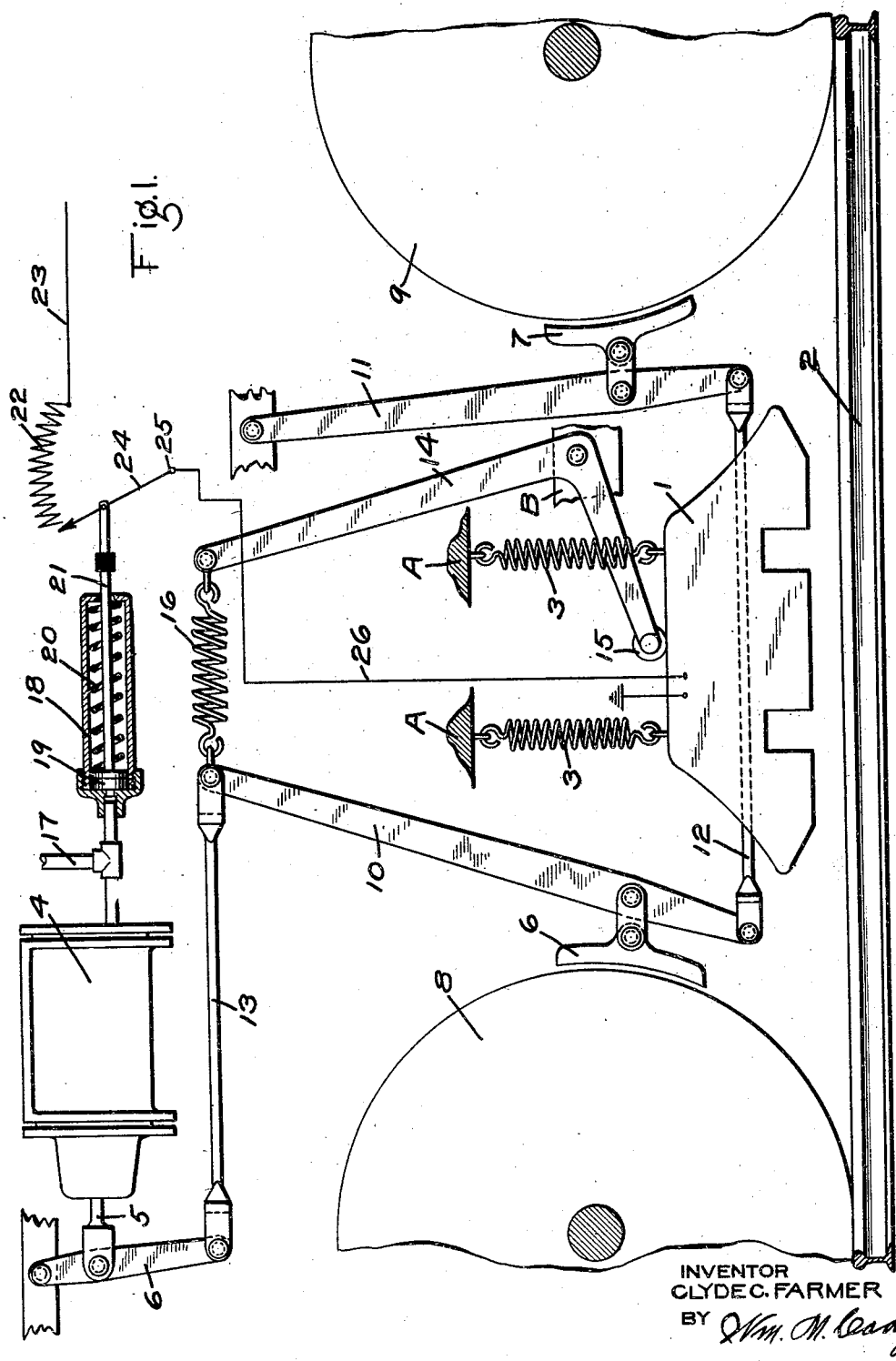
INVENTOR
CLYDE C. FARMER
BY *Wm. M. Cady*
ATTORNEY

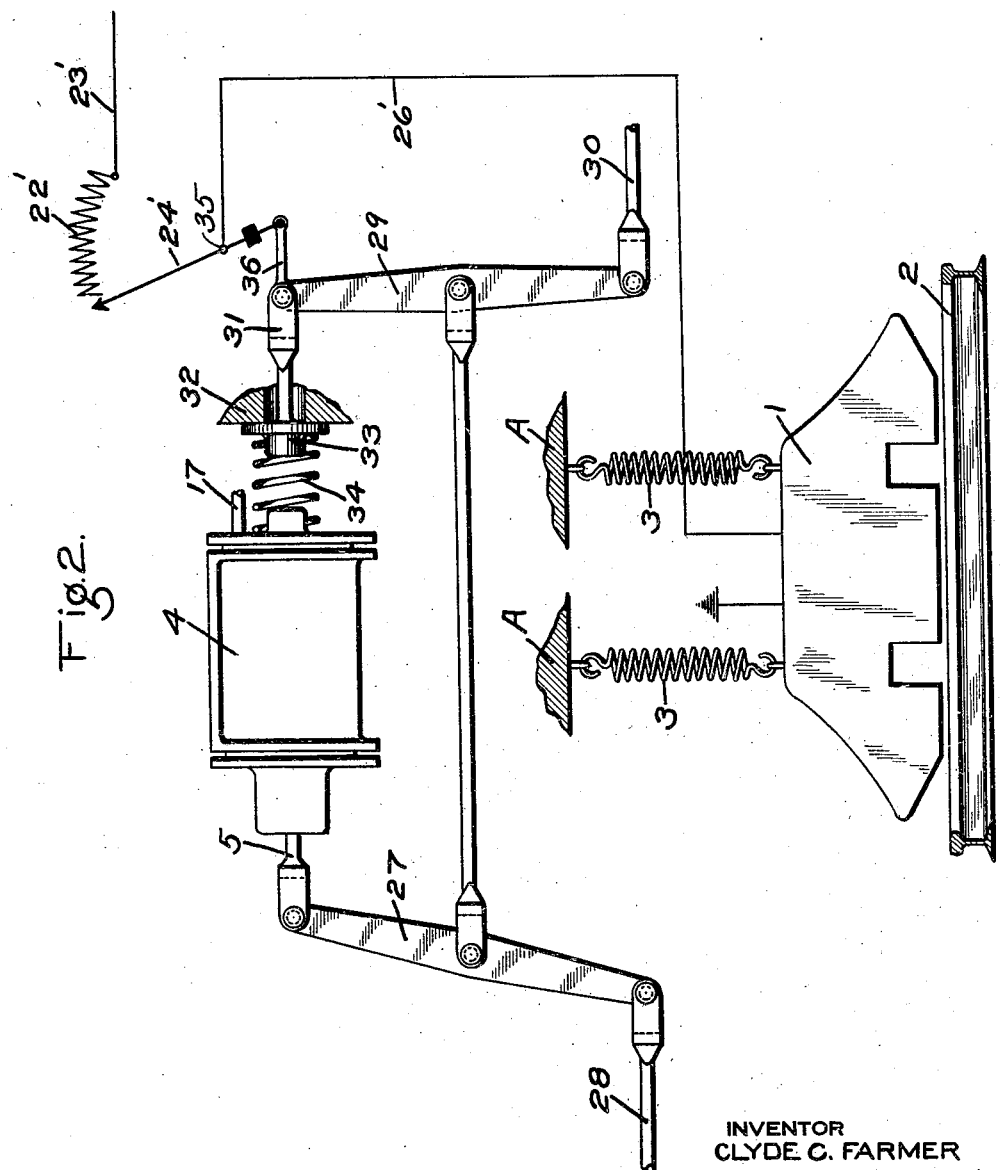

Patented Jan. 27, 1931

1,790,208

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNETIC BRAKE

Application filed February 17, 1928. Serial No. 255,035.

This invention relates to magnetic brakes, and more particularly of the type employing a magnetic brake shoe adapted to engage the rail and associated with a fluid pressure operated wheel brake apparatus.

One object of my invention is to provide means operated upon initiating an application of the brakes for moving the magnetic brake shoe from a position above the rail, into engagement with the rail.

Another object of my invention is to provide means for varying the current supplied to a magnetic brake shoe in proportion to the degree of application of the fluid pressure brake.

In the accompanying drawings; Fig. 1 is a diagrammatic view of a brake equipment embodying my invention; and Fig. 2 a diagrammatic view of a brake equipment, showing a slightly modified form of my invention for varying the current supplied to the magnetic brake shoe in proportion to the degree the fluid pressure brakes are applied.

As shown in Fig. 1, the brake equipment may comprise a magnetic brake shoe 1 which is normally held suspended away from each rail 2 by means of coil springs 3, secured to the car body as indicated at A. A fluid pressure brake is provided comprising a brake cylinder 4 having a piston rod 5 which is connected to a lever 6 fulcrumed on the car. Brake shoes 6 and 7, adapted to engage car wheels 8 and 9 respectively, are operatively connected, the brake shoe 6 to a live lever 10 and the brake shoe 7 to a dead lever 11, the levers 10 and 11 being connected by a rod 12, and the live lever 10 by a rod 13 with the lever 6.

It will be understood that the actual brake lever mechanism as employed on a car is not shown in the drawing, the arrangement shown being merely a diagrammatic construction sufficient to illustrate the operation of my invention.

According to my invention, means for moving the magnetic brake shoe 1 to engagement with the rail when the brakes are applied are provided, which may comprise a bell crank lever 14 fulcrumed on a fixed portion B of the car, and having the end of one arm provided with a roller 15 adapted to engage the top face of the brake shoe 1. The end of the other arm is connected by a coil spring 16 with the upper end of the live lever 10.

The pipe 17, through which fluid under pressure is supplied to and released from the brake cylinder 4 is also connected to a cylinder 18 which contains a piston 19, subject on one side to the pressure of a coil spring 20 and having a piston rod 21. A rheostat is provided having a variable resistance coil 22 connected at one end to a current supply wire 23, and having a movable contact member 24, fulcrumed at 25, and connected to the piston rod 21. The member 24 is electrically connected to wire 26, through which current is supplied to the usual magnet coils (not shown) of the magnetic brake shoe 1.

In operation, when the brakes are released, the parts are in the position shown in Fig. 1, with the magnetic brake shoe 1 held suspended by the springs 3 away from the rail 2, the brake shoes 6 and 7 maintained out of engagement with the wheels 8 and 9, and the contact member 24 maintained out of engagement with the resistance coil 22 by the spring 20, so that no current is supplied to the magnetic brake shoe 1.

The brakes are applied by supplying fluid under pressure through pipe 17 to the brake cylinder 4 in the usual manner and the usual brake cylinder piston (not shown) in the brake cylinder 4 operates through the rod 13 and the levers 10 and 11 to cause the brake shoes 6 and 7 to engage the car wheels 8 and 9.

The movement of the live lever 10 in applying the brakes acts through the spring 16 to effect the movement of the bell crank 14, so that the roller 15 operates to press the magnetic brake shoe 1 downwardly into engagement with the rail 2.

As the fluid pressure in the brake cylinder 4 increases, the pressure acting on piston 19 overcomes the resistance of spring 20 and piston 19 is moved toward the right, so that the contact member 24 is caused to engage the resistance coil 22 and thereby close the circuit for supplying current to the magnetic brake shoe.

The extent to which the contact member 24 is moved toward the right depends upon the degree of pressure of fluid supplied to the brake cylinder 4 and as the brake cylinder pressure is increased, the contact member is moved to cut out more resistance and thus increase the current supplied to the magnetic brake shoe 1 in proportion to the pressure of fluid supplied to the brake cylinder.

In the construction shown in Fig. 2, instead of varying the current supplied to the magnetic brake shoe by means operated by the pressure of fluid in the brake cylinder, the current is varied by connecting the contact arm of the rheostat with the brake rigging. In the Fig. 2 construction, the brake lever 27 is connected at one end to the brake cylinder piston rod 5 and at the other end to a pull rod 28, through which the brake shoes of a pair of wheels are operated. The brake lever 29 is connected at one end to a pull rod 30, through which the brake shoes of another pair of wheels are operated. The other end of lever 29 is pivotally connected to a fulcrum member 31, which extends through an opening in a bracket 32 secured to the car and which is provided with a collar 33 adapted to engage the bracket 32 and subject to the pressure of a spring 34.

The contact arm 24' of the rheostat is fulcrumed at 35 and is operatively connected through a link 36 with the lever 29.

With this construction, when the brakes are applied by supplying fluid under pressure to the brake cylinder 4, the force with which the brakes are applied acts through lever 29 on the fulcrum member 31 and tends to move the collar 33 away from the bracket 32 against the pressure of spring 34 and in proportion to the force with which the brakes are applied.

The movement of the fulcrum member 31 toward the left causes movement of the contact arm 24', so as to effect contact with the resistance coil 22'. The circuit to the magnetic brake shoe 1 is thus closed and the brake shoe is energized to effect a braking action on the rail.

The greater the force with which the brakes are applied, the greater the movement of the member 31 toward the left, and the greater the movement of the contact arm 24' to reduce the resistance of the coil in the circuit.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a magnetic brake shoe, wheel brakes, and means for applying the wheel brakes, of means mechanically connected to and operated upon applying the wheel brakes for moving the magnetic brake shoe into engagement with the rail.

2. The combination with a magnetic rail engaging brake shoe and a wheel brake apparatus, of means mechanically connected to and operated upon applying the wheel brakes for moving the magnetic brake shoe into engagement with the rail.

3. The combination with a magnetic rail brake shoe, wheel brakes, and a brake apparatus operated by fluid under pressure for controlling the wheel brakes, of a member mechanically connected to the wheel brake apparatus for moving the magnetic brake shoe to the rail upon applying the wheel brakes.

4. The combination with a magnetic rail brake shoe, of wheel brakes, a lever through which the wheel brakes are applied, and a member operatively connected to said lever and engaging said magnetic brake shoe for moving the magnetic brake shoe to engage the rail upon movement of said lever to apply the wheel brakes.

5. The combination with a magnetic rail brake shoe, of wheel brakes, a brake lever through which the wheel brakes are applied, and a lever fulcrumed on the vehicle and operatively connected to said brake lever and engaging said magnetic brake shoe.

6. The combination with a magnetic rail brake shoe, of wheel brakes, a brake lever through which the wheel brakes are applied, a fulcrumed lever, and a spring connecting one end of said lever with said brake lever, the other end of said fulcrumed lever engaging said magnetic brake shoe.

7. The combination with a magnetic rail brake shoe and a wheel brake apparatus, of means operated upon applying the wheel brakes for first closing a circuit for supplying current to the magnetic brake shoe and then varying the current supply.

8. The combination with a magnetic rail brake shoe and a wheel brake apparatus, of means for varying the current supplied to the magnetic brake shoe in proportions to the force with which the wheel brakes are applied.

9. The combination with a magnetic rail brake shoe and a wheel brake apparatus, of a resistance and means for supplying current to the magnetic brake shoe through said resistance upon applying the wheel brakes and operative to cut down the resistance in the circuit as the force with which the wheel brakes are applied is increased.

10. The combination with a magnetic brake and a fluid pressure brake, of means operated by the pressure of fluid supplied to operate the fluid pressure brakes for first closing a circuit through which current is supplied to the magnetic brake and for varying the current according to the pressure of fluid supplied.

11. The combination with a magnetic brake and a fluid pressure brake, of means operated according to the pressure of fluid supplied in applying the fluid pressure brakes for varying the current to said magnetic brake.

12. The combination with a magnetic brake and a fluid pressure brake, of a rheostat and means for operating said rheostat to vary the current supplied to said magnetic brake in proportion to the degree of fluid pressure supplied to apply the fluid pressure brakes.

13. The combination with a magnetic brake and a brake cylinder, of a contact arm movable to vary the resistance in the circuit of the magnetic brake and a piston connected to said arm and operated by fluid under pressure supplied to the brake cylinder.

14. The combination with a magnetic brake and a brake cylinder, of a contact arm movable to vary the resistance in the circuit of the magnetic brake, a spring, and a piston subject to the opposing pressures of the spring and the pressure of fluid supplied to the brake cylinder for operating said contact arm.

15. The combination with a magnetic rail brake shoe, of means operated by variations in fluid pressure for varying the current supplied to said shoe and manually operable means for controlling the fluid pressure on said varying means.

16. The combination with a magnetic brake shoe, of a variable resistance in the energizing circuit of said shoe, a rotatable device, rotatable to vary the amount of said variable resistance in said circuit, a fluid pressure operated device for actuating said rotatable device, and a manually controlled valve for controlling the fluid pressure on said fluid pressure operated device.

In testimony whereof I have hereunto set my hand.

CLYDE C. FARMER.